US008478579B2

(12) United States Patent
Chin et al.

(10) Patent No.: US 8,478,579 B2
(45) Date of Patent: Jul. 2, 2013

(54) CONDITIONAL TRANSLATION HEADER FOR TRANSLATION OF WEB DOCUMENTS

(75) Inventors: Jeffrey Chin, San Francisco, CA (US); Darren Lewis, Wake Forest, NC (US); Joshua Estelle, San Francisco, CA (US)

(73) Assignee: Google Inc., Mountain View, CA (US)

( * ) Notice: Subject to any disclaimer, the term of this patent is extended or adjusted under 35 U.S.C. 154(b) by 945 days.

(21) Appl. No.: 12/533,613

(22) Filed: Jul. 31, 2009

(65) Prior Publication Data

US 2010/0286977 A1 Nov. 11, 2010

Related U.S. Application Data

(60) Provisional application No. 61/175,739, filed on May 5, 2009.

(51) Int. Cl.
*G06F 17/28* (2006.01)

(52) U.S. Cl.
USPC ............... 704/2; 704/3; 704/4; 704/5; 704/8; 704/277

(58) Field of Classification Search
USPC .................................. 704/2, 3, 4, 5, 8, 277
See application file for complete search history.

(56) References Cited

U.S. PATENT DOCUMENTS

| | | | |
|---|---|---|---|
| 6,901,367 B1 * | 5/2005 | Berstis et al. .................. | 704/277 |
| 7,389,221 B1 * | 6/2008 | Pearson et al. .................... | 704/2 |
| 2001/0018649 A1 * | 8/2001 | Kasai et al. ........................ | 704/3 |
| 2004/0102956 A1 * | 5/2004 | Levin ................................ | 704/2 |
| 2005/0267738 A1 | 12/2005 | Wilkinson et al. | |
| 2006/0133585 A1 * | 6/2006 | Daigle et al. ................ | 379/88.06 |
| 2009/0234633 A1 * | 9/2009 | Chao-Suren et al. ............ | 704/2 |

FOREIGN PATENT DOCUMENTS

WO  WO 01/57722  8/2001

OTHER PUBLICATIONS

International Preliminary Report on Patentability dated Nov. 9, 2011 for International Appln. No. PCT/US2010/032998, 9 pages.
Authorized Officer Justin Woods, International Search Report and the Written Opinion, dated Aug. 4, 2010, for International Application No. PCT/US2010/032998, filed Apr. 29, 2010, 15 pages.
Chin, Jeff "Translate Your Website With Google: Expand Your Audience Globally," Sep. 30, 2009, XP002593018, Retrieved from the Internet: URL:http://googleblog.blogspot.com/2009/09/translate-your-website-with-google.html [retrieved on Jul. 21, 2010], the whole document, 2 pages.
Dedhia, Sandip "Google Translation Service Coming to Gmail," Mar. 30, 2009, XP002593017, Retrieved from the Internet: URL:http://www.blogsdna.com/2812/google-translation-service-coming-to-gmail.htm [retrieved on Jul. 21, 2010], the whole document, 1 page.
Lewis, Darren "New in Labs: Automatic Message Translation," May 19, 2009, XP002593019, Retrieved from the Internet: URL:http://gmailblog.blogspot.com/2009/05/new-in-labs-automati_c-message.html [retrieved on Jul. 21, 2010], the whole document, 2 pages.

* cited by examiner

*Primary Examiner* — Vincent P Harper
(74) *Attorney, Agent, or Firm* — Remarck Law Group PLC

(57) ABSTRACT

Methods, systems, and apparatus, including computer program products, for translation of web documents. The original language of document text in the web document is identified. A translation header is displayed with the web document text only if the original language is different from a user's preferred language. The translation header provides the user with an option of translating the document text or portions of the document text to the user's preferred language.

21 Claims, 9 Drawing Sheets

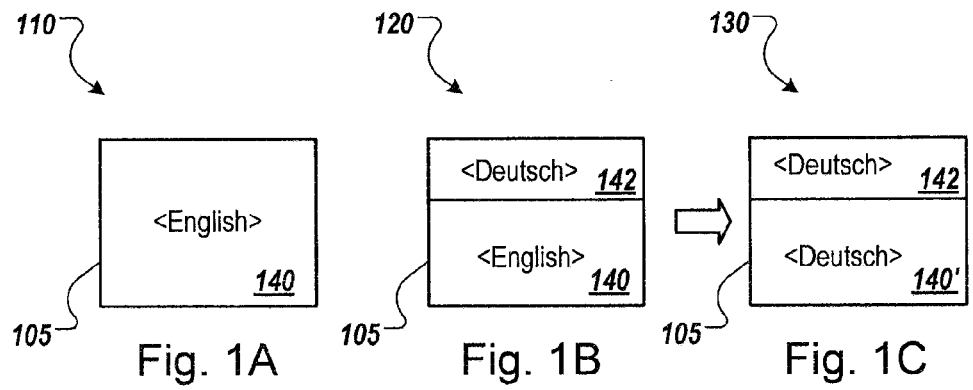
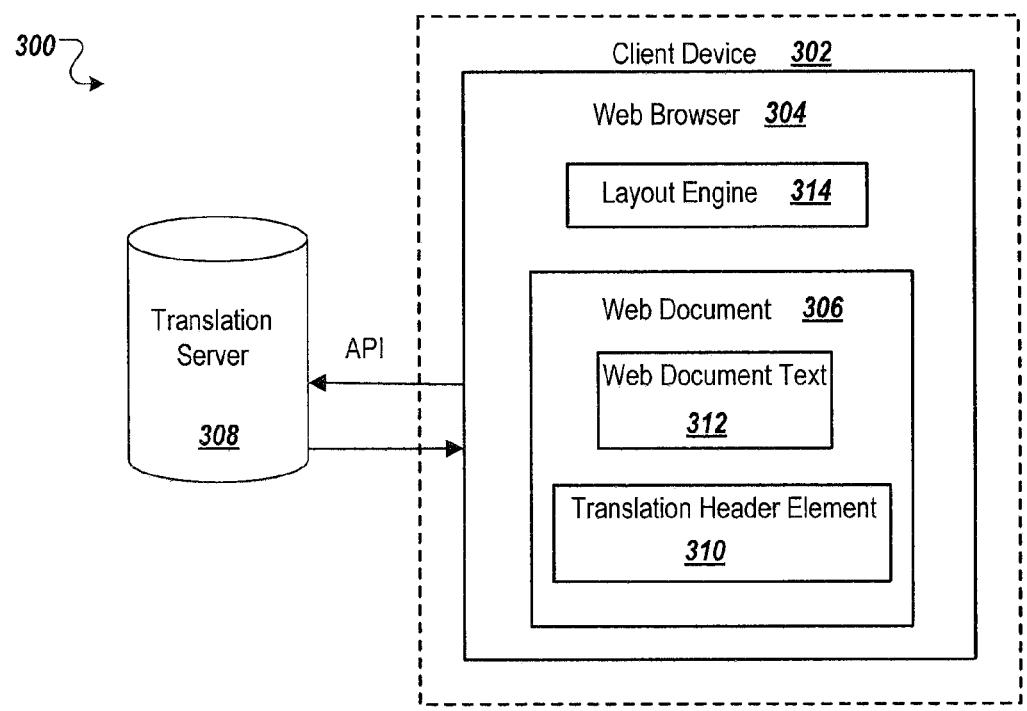

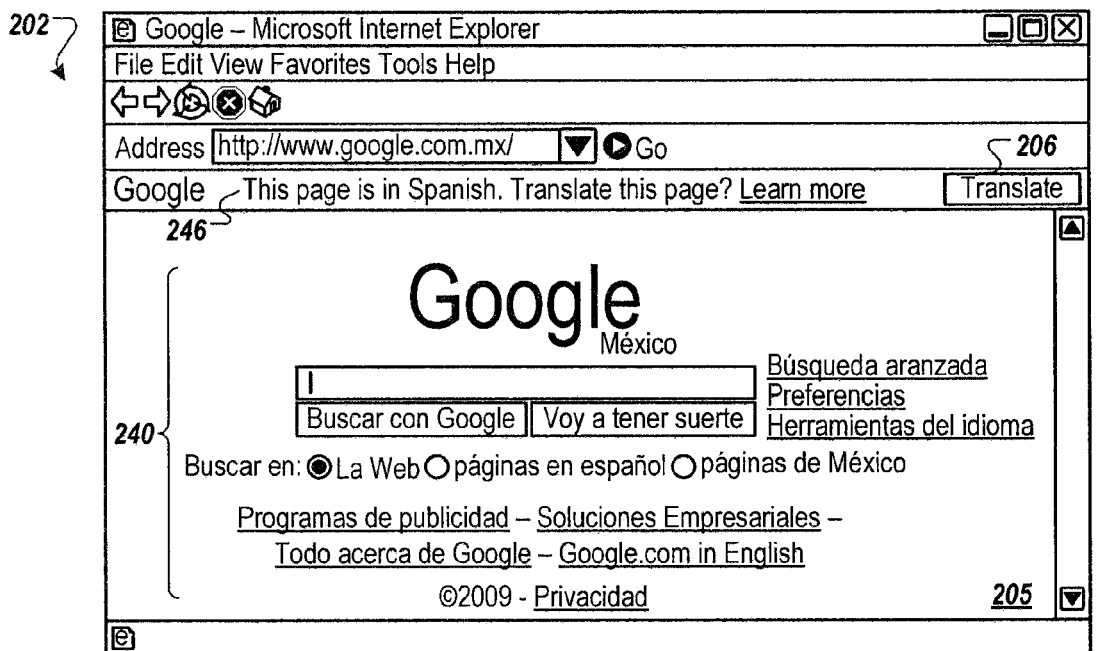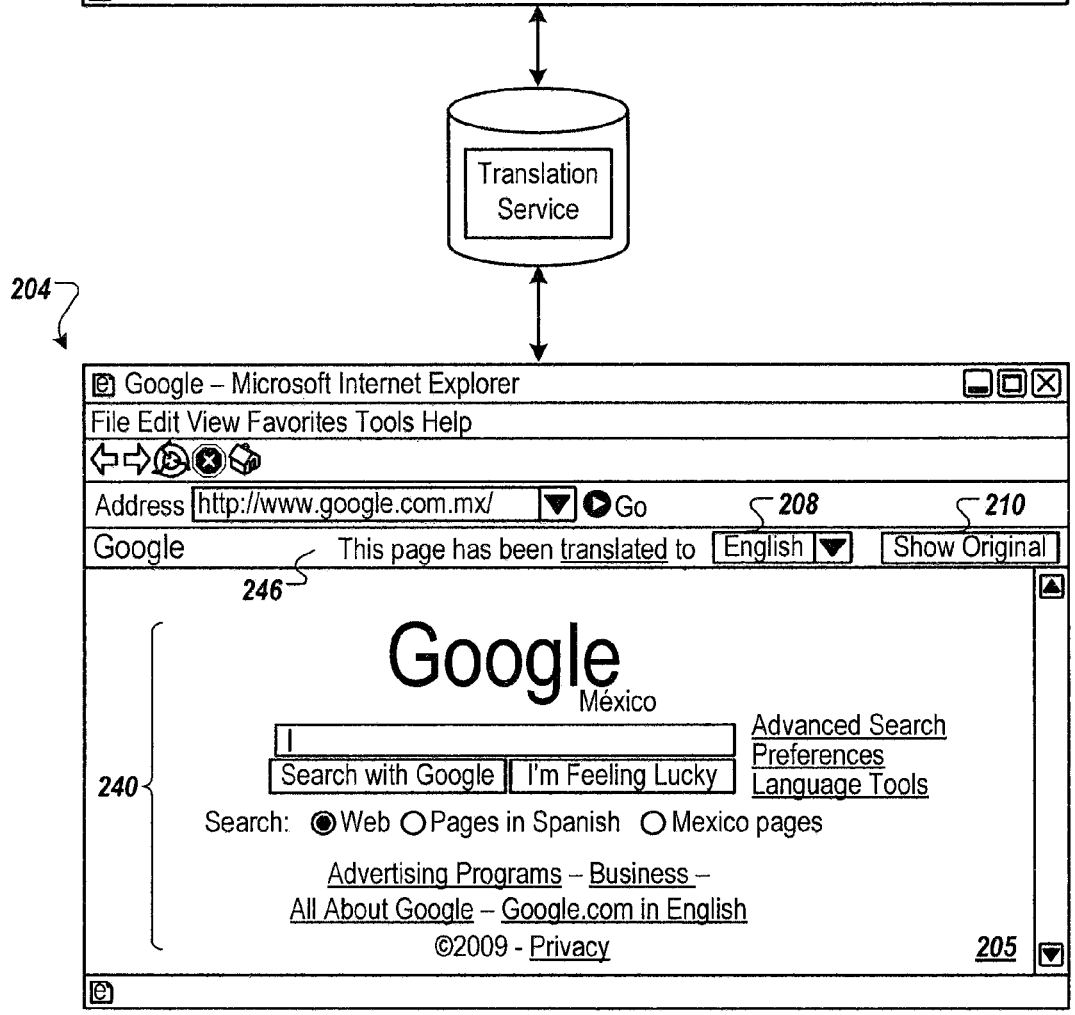
Fig. 2

CONDITIONAL TRANSLATION HEADER FOR TRANSLATION OF WEB DOCUMENTS

CROSS-REFERENCE TO RELATED APPLICATION

This application claims the benefit under 35 U.S.C. § 119(e) of U.S. Provisional Patent Application No. 61/175,739, entitled "Conditional Translation Header for Translation of Web Documents," filed May 5, 2009, which is incorporated here by reference.

BACKGROUND

This specification relates to translation of text in web documents.

The proliferation of the Internet has made web documents in many different languages readily accessible to users. Various web document translation mechanisms are available to assist a user in reading web document text displayed in a language unfamiliar to the user. Typically such translation mechanisms are integrated into and accessible through a toolbar of a web browser program or are provided by the web page itself (e.g., a script embedded within the web page). However, the translation cues provided by these translation mechanisms are static, i.e., shown to users regardless of the language in which the text of a web document is displayed.

Another translation mechanism is integrated into a search results page that displays search results. A search result includes a web page title, a snippet of text extracted from the web page, and the URL of the web page. The URL can be provided in the form of a resource link to the web page referenced by the search result. If the text of the web page referenced by a search result is in a language that is different from a preferred language specified for a browser on which the search results are displayed, the search results page can include a selectable option to translate the web page referenced by the search result. However, the user must select the option to translate the web page from within the search results page, and cannot select the option to translate the page from the actual web page itself.

SUMMARY

In general, the subject matter of this specification describes technologies relating to conditional translation headers for translating web document text.

In general, one aspect of the subject matter described in this specification can be implemented in methods that include receiving, at a client device, a document comprising document text in a first language to be displayed on the client device; displaying, at the client device, the document text of the document; identifying, at the client device, a second language to which the document text may be translated; determining that the second language is different from the first language and displaying, only in response to the determination, a translation header with the document text, the translation header including text in the second language describing a selectable option in the translation header to translate document text from the first language to the second language; and in response to a selection of the selectable option: identifying, at the client device, a portion of the document text to be translated; sending a request from the client device to a translation server to translate the portion of the document text from the first language to the second language; in response to the request, receiving at the client device translation data including a corresponding translated portion of the document text in the second language; and displaying, at the client device, the translated portion of the document text of the document.

Particular embodiments of the subject matter described in this specification can be implemented so as to realize one or more of the following advantages. The translation header is shown on a rendered web document (e.g., a web page) only when appropriate, such as when the web document text is in a language other than a user preferred language.

Selectively displaying the translation header eliminates the display footprint of the translation header when translation is not needed, thus maximizing the display area for the web document content.

When translation of web document text is determined to be needed, the translation header is prominently displayed with the web document text. Such a configuration permits a user to quickly identify that translation is available and request translation of the web document text without navigating through a menu or searching for a translation mechanism on the web document or in a toolbar of the operative web browser program.

Additionally, when a document is provided in response to selecting a search result, the user need not navigate back to the search result page to request a translation of text within the web document if a translation of web document text is determined to be needed. Instead, the translation header is prominently displayed with the web document text and the user may request a translation from within the web document.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

FIGS. 1A-1C illustrate example block diagrams of web document display formats of a web document.

FIG. 2 illustrates an example display of a web document and an example display of a translated version of the web document.

FIG. 3 illustrates an example architecture of a system that provides a conditional translation header for translation of web document text in a web document.

Like reference symbols in the various drawings indicate like elements.

DETAILED DESCRIPTION

Figure 4:
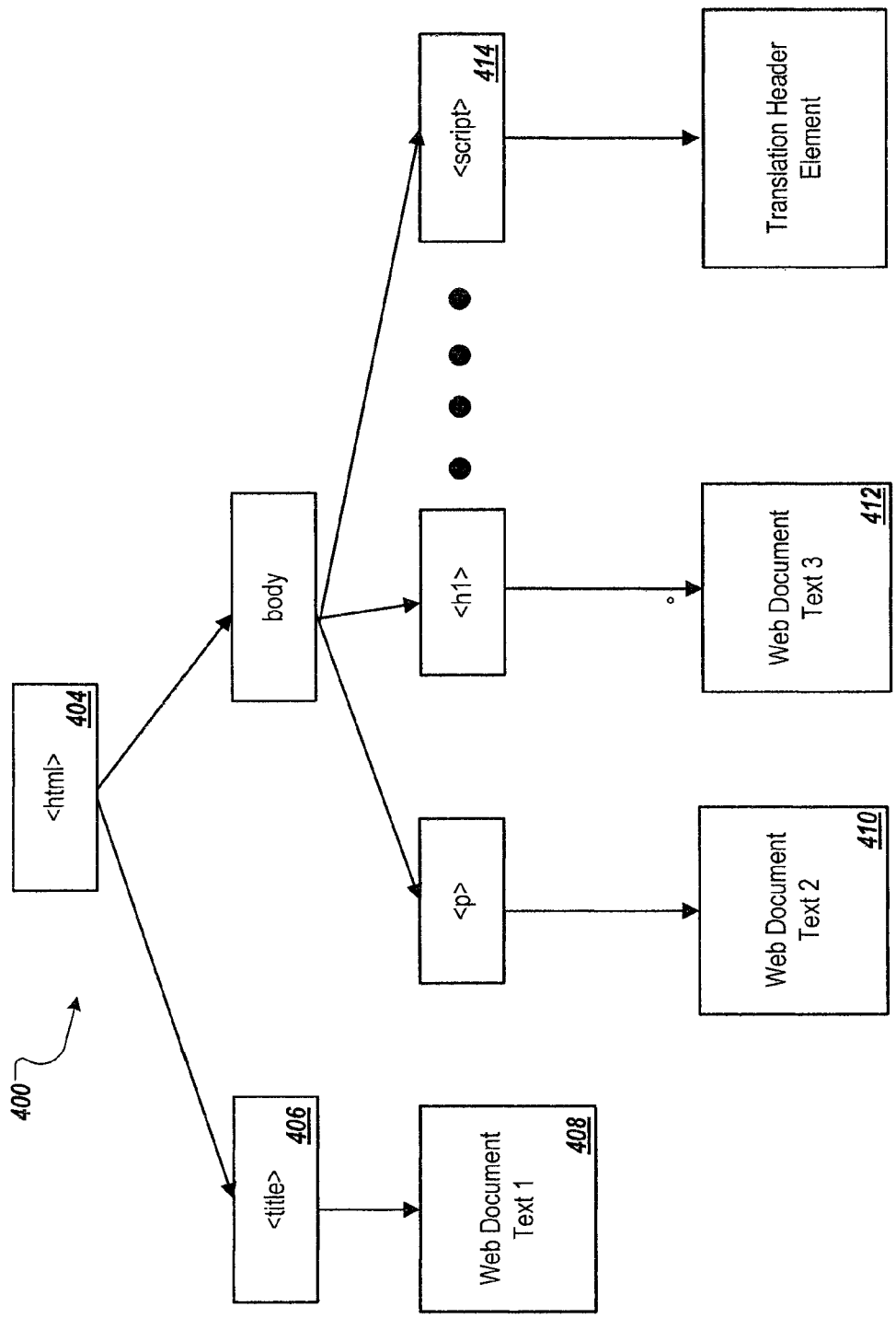
FIG. 4 illustrates an example DOM representation of a web document having web document text and a translation header element.

This specification relates to displaying a conditional translation header in a rendered web document only if the web document includes text in a language other than one or more specified languages, such as a user's preferred language. A web document is a document annotated with a markup language that is provided to or accessible by a client device over a network, such as the Internet. An exemplary web document is an HTML document, which can be rendered on the client device by use of a web browser program.

The translation header is an interactive object that provides a selectable option allowing a user to request translation of the web document text to a specified language different from the language in which the web document text is originally displayed to the user. In some implementations, a script (i.e., executable or interpreted program instructions) is included in the web document and executed by the web browser program. The script causes the web browser program to display the translation header only if the client device (e.g., by execution of the script) determines the language of the web document text to be different from a specified language associated with the client device.

A client device is an electronic device that is under control of a user and is capable of requesting and receiving web documents and other content over a network, such as the Internet or an intranet. Example client devices include personal computers, mobile communication devices, and other devices that can send and receive data over the network.

FIGS. 1A-1C illustrate example block diagrams of web document display formats 110, 120 and 130 of a web document 105. The display format of the web document 105 is determined based on the original language of the web document text (i.e., the language of the text of the web document as created or authored and in which it is provided to client devices in response to a request from the client device), one or more specified languages, and whether translation of the web document text has occurred, as explained below. As used herein, web document text is text that is rendered and visible on a client device, e.g., text associated with a text node in a document object model (DOM).

Display format 110 includes web document text 140 in an original language and does not include a conditional translation header. The web document 105 is displayed in display format 110 if the original language of the web document text is the same as a specified language of a client device. For example, the web document 105 will be displayed in the display format 110 if the original language is English and specified language of a client device is also English.

Display format 120 includes web document text 140 in an original language and a conditional translation header 142 with translation header text in a specified language, such as a preferred user language that is different from the original language. The web document 105 is displayed in display format 120 if the original language of the web document text 140 is different from the specified language of a client device, and if the translation process for the web document text has not been initiated and/or completed. For example, the web document 105 will be displayed in the display format 120 if the original language is English and the specified language is German, and the translation process for the web document text 140 has not been initiated.

Display format 130 includes web document text 140' in the specified language and the translation header text in the specified language. The web document 105 is displayed in display format 130 if the original language of the web document text is different from the specified language and the translation process for the web document text has been completed. For example, the web document 105 will be displayed in the display format 130 if the original language is English and the specified language is German, and the translation process for the web document text 140 has been completed.

For each of the display formats 110, 120 and 130, the same web document is used, e.g., the same HTML document. The translation header 142, however, is only shown if the original language of the web document text 140 is different from the specified language of a client device FIG. 2 illustrates an example display 202 of a web document 205 and an example display 204 of a translated version of the web document 205. The example displays 202 and 204 are generated by a web browser program on a client device for which the English language is specified.

In example display 202 the web browser displays the web document 205 with web document text 240 in the original language and a conditional translation header 246 with translation header text in the specified language (e.g., display format 120 of FIG. 1B). For example, in the display 202 the original language of the web document text 240 is Spanish and the specified language of the client device is English. The translation header 246 includes translation header text prompting an input for translation of the web document text 240, e.g., "Translate this page?" and, optionally, translation header text identifying the original language of the web document text 240, e.g., "This page is in Spanish."

The input prompted by the translation header text can be, for example, user selection of a selectable option such as a "Translate" button 206. In some implementations the translation header text also identifies the specified language (e.g., the preferred language). For example, the translation header 246 may include the text "Translate this page from Spanish to English?" The translation header 246 illustrated in and described with reference to display 202 is a first display configuration of the translation header 246. For example, the translation header 246 is displayed in the first display configuration prior to a selection of the selectable translate option, e.g., Translate button 206.

In some implementations, a selectable option in the translation header can allow a user to identify the original language of the web document text 240, as opposed to relying on, for example, an automated language identification process. Optionally, or alternatively, the translation header selectable option can allow a user to identify the language to which the web document text 240 is to be translated. These options permit a user to explicitly define the language of the web document text 240 and/or the language to which the web document text 240 will be translated.

In example display 204 the web browser displays the web document 205 with web document text 240 in the specified language, and the translation header 246 with translation header text in the specified language (e.g., display format 130 of FIG. 1C). The translation header 246 includes translation header text identifying that the web document text 240, or a portion of the web document text 240, has been translated and, optionally, one or both of the original language or specified language. For example, the translation header 246 may include "This page has been translated to English."

In some implementations, the translation header 246 also includes a language selection option 208 to allow a user to select another language to which the web document text 240 is to be translated. For example, the language selection option 208 can be a drop down menu listing available languages. Selection of a language from the language selection option 208 causes the web document text to be translated and displayed in the selected language.

In some implementations, the translation header 246 also includes another selectable option 210 to return the display of the web document as shown in display 204 to display 202. Thus selecting the selectable option 210 causes the browser to display the web document text 240 in the original language, i.e., Spanish. The translation header 246 illustrated in and described with reference to display 204 is displayed in a second display configuration. For example, the translation header 246 is displayed in the second display configuration subsequent to a selection of the selectable translate option, e.g., Translate button 206.

FIG. 3 illustrates an example architecture of a system 300 that provides a conditional translation header for translation of web document text 312 in a web document 306. A client device 302 runs a web document display program, e.g., a web browser 304, to render the web document 306.

The web document 306 includes web document text 312 and a translation header element 310. The web document text 312 is textual content displayed when the web browser 304 renders the web document 306. The translation header element 310 is program code (e.g., JavaScript) executable by the web browser 304. The translation header element 310 provides for the display of the translation header 246 and the functionality of the translation header 246.

For convenience, when the translation header element 310 is described as performing actions, it is meant that the web browser 304 is executing the program code defined by the translation header element 310 to cause the actions to be performed.

The web browser 304 retrieves the web document 306. The web browser 304 can retrieve the web document 306, for example, by sending a request for the URL of the web document according to the retrieval method specified by its URL, such as by using a hypertext transfer protocol (HTTP). The translation header element 310 identifies the original language ("first language") of the web document text 312.

In some scenarios, the original language of the web document text 312 is specified in the web document 306 or specified in metadata retrieved with the web document 306. For example, the publisher of the web document 306 may embed data identifying the original language, such as a language tag.

In other examples, the web document 306 may be handled by an agent before reaching the web browser 304, such as an email message being handled by an email server. The agent or a system responsive to the agent may process the web document 306 to identify the original language or language(s) of the text of the web document and then send data identifying the original language(s) to web browser 304 along with the web document 306.

In such scenarios described above, the translation header element 310 identifies the original language from the provided information. However, if the original language is not specified in the web document 306 or associated metadata, then in some implementations the translation header element 110 can query, for example, a translation server 308 for identification of the original language. In other implementations the translation header element 310 can receive input (e.g., from a selectable option displayed in the translation header) from a user identifying the original language, for example, from a drop down menu or a text box rendered by the web browser 304. In still other implementations, the translation header element 310 can access a language identification program resident on the client device 302. The language identification program can process the text of the web document 306 to identify the language(s) of the web document text 312. Any number of known language identification or detection techniques can be used by the client device or translation service.

The translation header element 310 identifies one or more specified languages ("second languages") in which web document text 312 is to be displayed on the client device 302. The specified languages are typically languages that the user of the client device 302 prefers. These preferences can be either explicit or implicit, and thus the specified languages can be identified in numerous ways. For example, from a network server side, the specified languages can be identified from various source indicators such as an (A) HTTP request header (Accept-Language), (B) a last-changed target language (e.g., second language) used by, for example, the translation header element 310 and saved in a cookie on the client device and reported by the translation header element 310, (C) a last-used target language with a translation server/service, or (D) a last-used user interface language with a translation server/service. From a client device side, the specified languages can be identified from, for example, (E) web browser settings or (F) URL parameters (e.g., a query parameter).

If more than one specified language is identified (e.g., from one or both of the server side or client device side) then the specified languages can be ordered or prioritized according to their source and/or how recently a corresponding translation occurred. In some implementations, the translation header element 310 can prioritize (e.g., order) the specified languages, for example, according to a source ranking/ordering hierarchy. For example, the hierarchy may dictate that the second language is determined by the following scheme with reference to the itemization above: (F)>(B)>(C)>(D)>(E)>(A). Thus in this example the specified language identified from the URL parameter (F), if present, is the second language to which the text is translated (i.e., a highest ordered second language). In some implementations, the specified language identified from the URL parameter (F) may be the most reliable source for identifying the specified language. However, other schemes and hierarchies can be used.

The translation header element 310 determines whether the original language is different from the specified language (e.g., the selected, specified language if more than one). If the languages are different, then the translation header element 310 causes the web browser 304 to concurrently display the translation header 246, with translation header text in the specified language, with the web document text 312 in the original language, and any other display content included in the web document 306, such as images (e.g., display format 120 of FIG. 1B). If the languages are not different, then the web document text 312 and any other display content included in the web document 306 are displayed without the translation header 246 (e.g., display format 110 of FIG. 1A).

The translation header element 310 can detect selections of selectable options in the translation header, such as a user click on the Translate button 206. In response to the selection of the selectable option 206, translation header element 3 10 identifies the web document text 312 to be translated or a portion of the web document text to be translated (i.e., if less than all of the web document text is eligible for being translated by the translation server 308). In some implementations, from the displayed web document text, a user can select the portion of web document text 312 to be translated by, for example, selecting certain web document text 312 with a mouse or other user input device.

In some implementations, the translation header element 310, or more generally the web browser 304, can identify the web document text 312 to be translated or the portion of the web document text 312 to be translated by use of a document object model (DOM) representation of the web document 306. For example, the web browser 304 can include a layout engine 314 to parse the web document 306 to generate a DOM representation or, equivalently, a data structure representation of the document 306. In some implementations, the layout engine 314 is distinct to the web browser 304, but is in data communication with the web browser 304 and works in concert with the web browser 304 to render web documents. The DOM representation provides a conduit through which scripts executed by the web browser 304 can inspect and modify the web document 306. For example, the DOM representation permits the translation header element 310 to identify and access web document text 312 in the web document for translation.

FIG. 4 illustrates an example DOM representation of a web document 400 having web document text and a translation header element. The DOM representation represents a web document as a hierarchical arrangement of nodes with each node corresponding to a portion of the web document. There are various types of nodes, for example, root nodes (e.g., the root node 404), element nodes (e.g., the title element node 406), text nodes (e.g., text nodes 408, 410, 412) and script nodes (e.g., script node 414). A text node is a node corresponding to web document text (e.g., 312) in the web document (e.g., 306), and includes text stored in the node. An element node is a node corresponding to an annotation in the web document such as a markup language annotation. A script node includes an executable script in the web document such as the translation header element. The arrangement of the nodes is determined by the hierarchical relationships between the nodes. The hierarchical relationships of the nodes are attributable to nested annotations in a web document.

Once the translation header element 310 has identified the web document text 312 to be translated (e.g., by use of the DOM representation), the translation header element 310 sends a request to the translation server 308 to translate the relevant web document text 312 to the specified language. In response to the request, the translation server 308 provides translation data to the client device 302. The translation data include the translated web document text in the specified language. The web browser 304 can render the web document 306 with translated web document text (e.g., display format 130 of FIG. 1C).

Figure 5A:
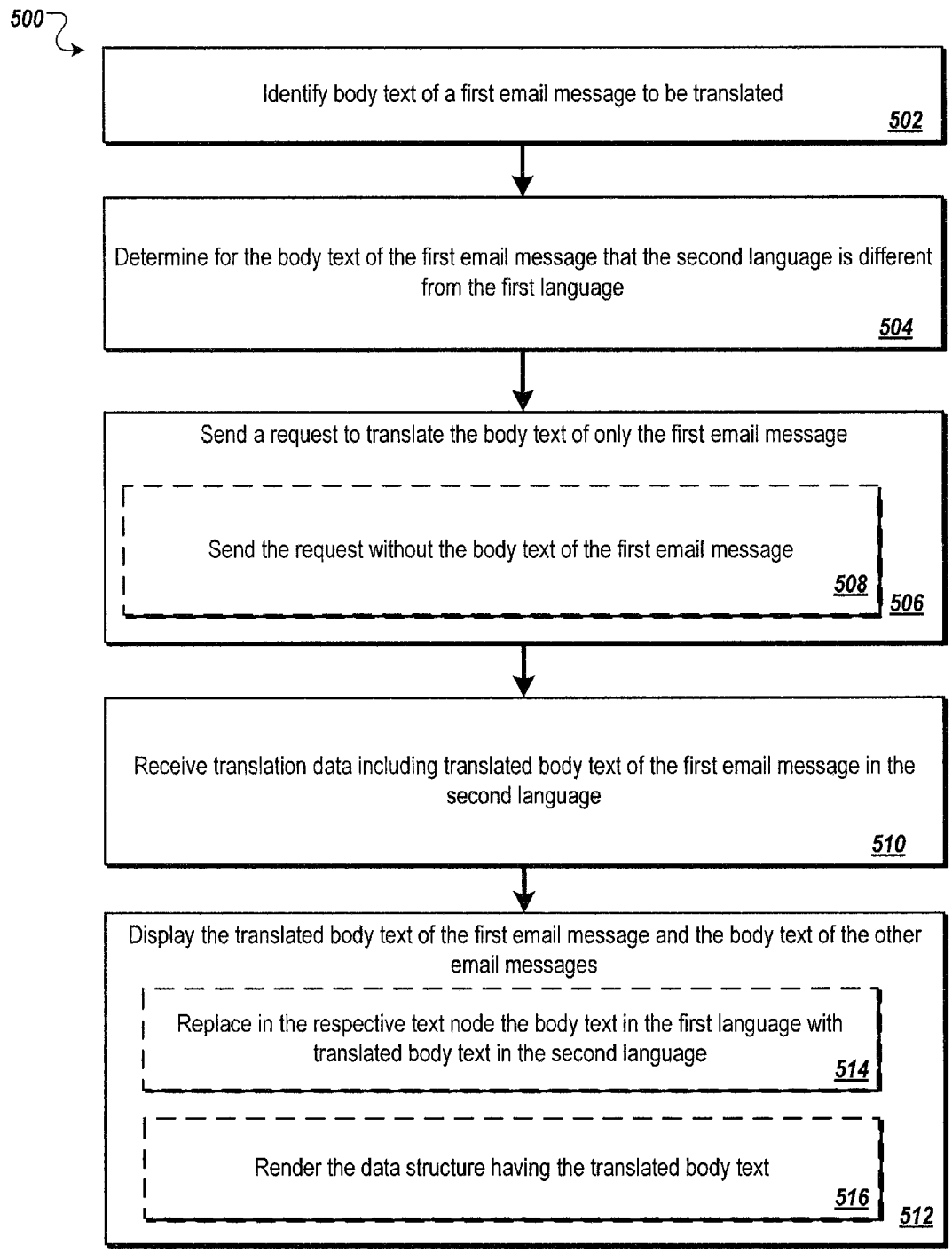
FIGS. 5A and 5D respectively are flow diagrams for an example method of translating text in email web pages, and an alternate example method of translating text in email web pages.
Figure 5B:
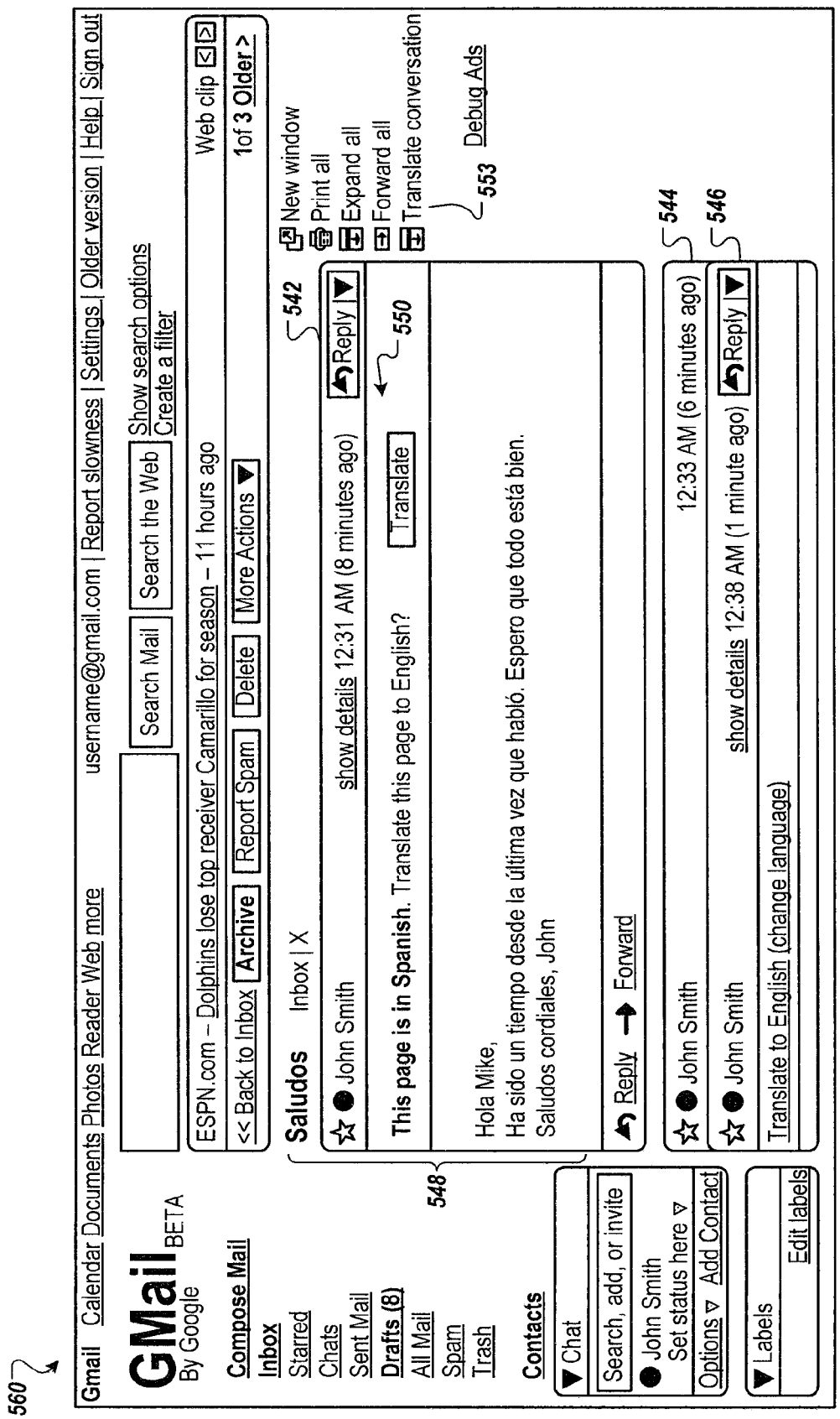
FIGS. 5B and 5C respectively illustrate an example display of an HTML email page, and an example display of the email page with translated text.
Figure 5C:
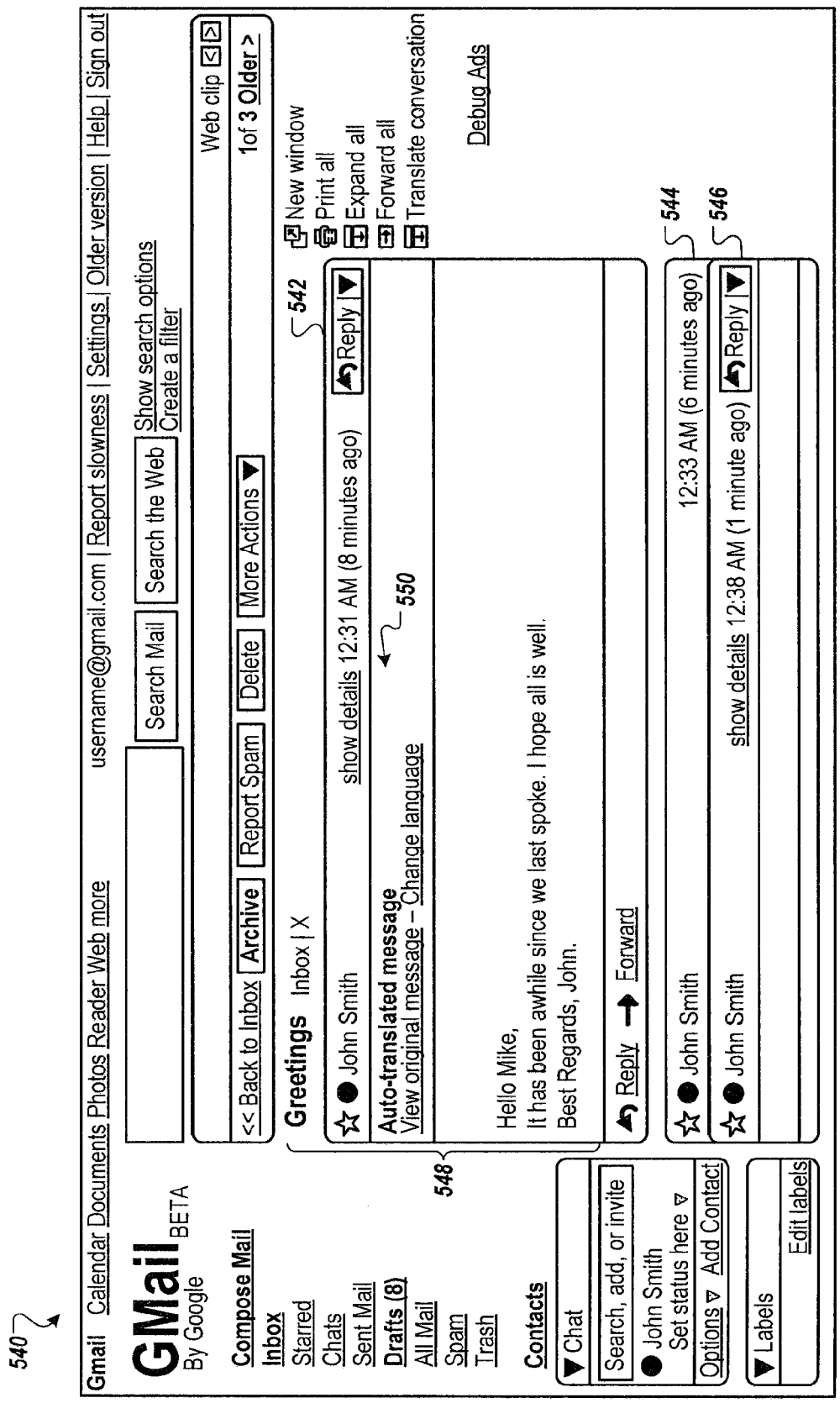
Figure 5D:
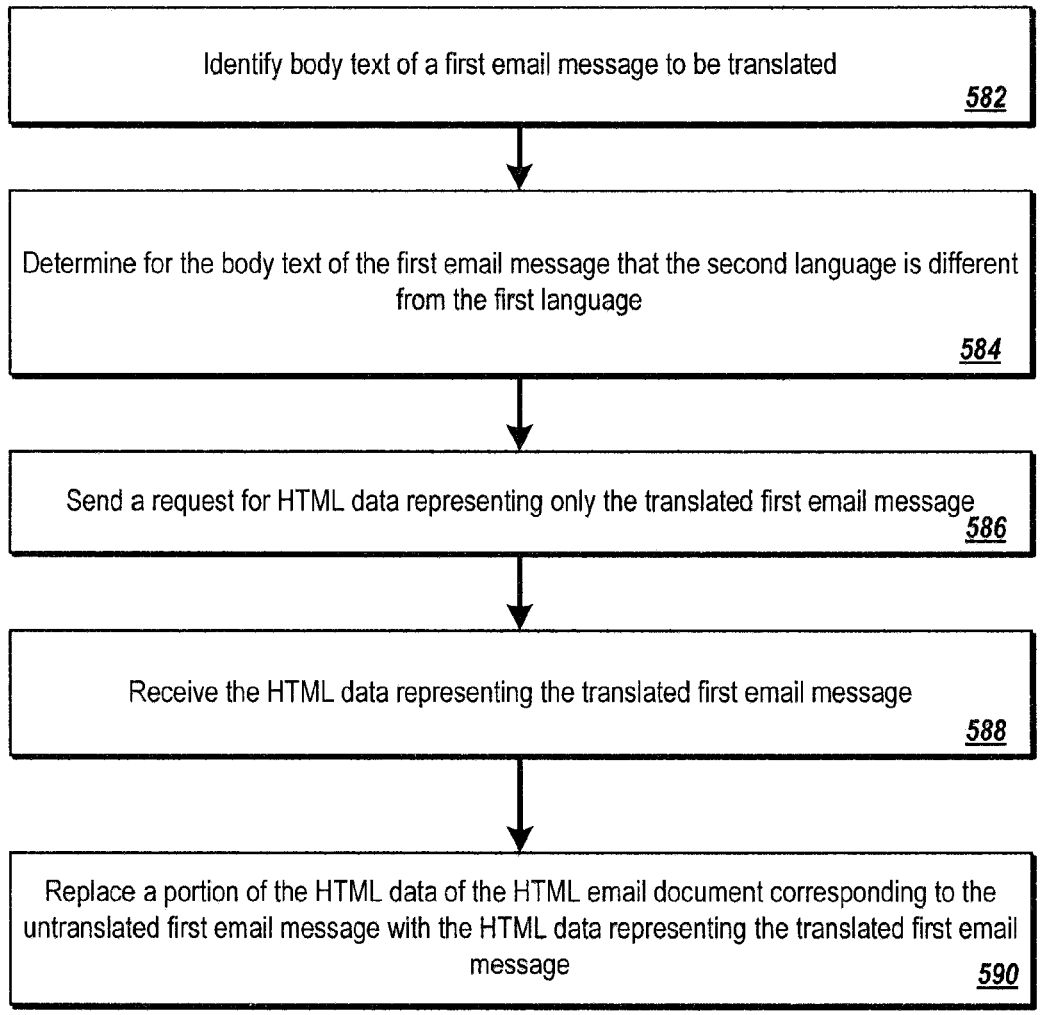

FIGS. 5A and 5D respectively are flow diagrams for an example method of translating text in email web pages, and an alternate example method of translating text in email web pages. FIGS. 5B and 5C respectively illustrate an example display 560 of an HTML email page, and an example display 540 of the email page with translated text.

The example displays 540, 560 are generated by a web browser (e.g., 304). The web documents in displays 540 and 560 are email pages displaying email messages, and the web document text is the body text of the email messages. The body text are displayed as representations of the email messages. The body text of each email message can be included in a respective text node in a DOM representation. Additional text can also be included, for example, the subject text of the email message.

Display 560 illustrates an email page displaying multiple email messages, e.g., an email conversation. For example, display 560 shows first, second and third email messages 542, 544 and 546, respectively, although only email message 542 is expanded to show its body text 548. The original language (first language) of the body text in display 560 is Spanish.

In FIG. 5A, the body text of a first email message of the email messages to be translated is identified (502). The body text of a first email message (e.g., 542) of one or more displayed email messages can be identified as the body text of an active email message. For example, an active email message is an email message that is currently opened or otherwise selected, e.g., as indicated by a cursor position or other user inputs. With reference to display 560, email message 542 is the active email message as it is expanded (e.g., open). The body text 548 can be identified by its respective text node. The web browser 304 and/or the client device 302 can, by use of the translation header element 310, identify the body text to be translated.

For the body text of the first email message it is determined that the second language is different from the first language (504). The translation header element 310 can, for example, determine that the second language is different from the first language and display the translation header with the body text of the first email message. Display 560 shows the translation header 550 in a first display configuration with the body text 548. The translation header text identifies the second language (e.g., specified language) as English, i.e., the language to which the Spanish text should be translated.

In some implementations, each expanded email message that includes body text not in the specified language can be displayed with a translation header. For example, if email messages 544 and 546 were expanded then each message could be displayed with a translation header if the respective body texts were not in the specified language. In some implementations, the translation header element 310 can also cause the web browser 304 to display a "Translate conversation" button 553 to cause all email messages in the email conversation to be displayed with translated text.

A request is sent to the translation server to translate the body text of only the first email message (506). The request is sent only if the second language is different from the first language. The web browser 304 can, for example, send a request to the translation server 308 to translate the body text of only the first email message. The request to translate the body text of the first email message can be a request to translate the subject of the first email message and the body of the first email message.

As indicated by the dashed process box 508, the request of step 506, optionally, is a request sent to the translation server without the body text of the first email message (508). The web browser 304 can, for example, send the request to the translation server 308. The translation server can be in data communication (e.g., Remote Procedure Call protocol) with the email server handling the first email message. Because the email server distributed the first email message to the client device, it has access to the first email message or access to a copy of the first email message. As such the request can include an identifier of the first email message, instead of the body text of the first email message. The identifier of the first email message can be resolved by the email server or the translation server to identify the first email message. The translation server can then translate the body text of the email message.

Translation data including translated body text of the first email message in the second language are received (510). The translation data include the translated body text of the first email message in the second language. The web browser 304 can, for example, receive the translation data from the translation server 308.

The translated body text of the first email message and the body text of the other email messages are displayed (512). The web browser 304 can, for example, render the document including the body text of the first email message and the body text of the other email messages for display on the client device 302. The body text of the other email messages may only include the subject of those email messages if the other email messages are in a collapsed display format. Display 540 shows the translated body text of the first email message (e.g., email message 542) in the second language (i.e., English) and a collapsed display of the other email messages (e.g., email messages 544 and 546).

As indicated by the dashed process boxes 514 and 516, the display of step 512, optionally, includes replacing, in the respective text node, the body text of the first email message in the first language with the translated body text of the first email message in the second language (514), and rendering the data structure having the translated body text included in the respective text node (516). The translation header element 310 can, for example, replace the body text in the first language with the translated body text in the second language in the respective text node and render the data structure having the translated body text included in the respective text node. Display 540 shows the translated body text 548 of the first email message 542.

In FIG. 5D, steps 582 and 584 are the same as steps 502 and 504, respectively, explained above with reference to FIG. 5A.

A request is sent for HTML data representing only the translated first email message (586). The HTML data can include, in addition to the body text of the first email message, for example, formatting information for the first email message, quoted text detection information for the first email message, and hiding information for the first email message. The web browser 304 can, for example, send a request for HTML data representing the translated first email message. In some implementations, HTML data for more than one email message can be requested.

The HTML data representing the translated first email message are received (588). The web browser 304 can, for example, receive the HTML data from the translation server 308.

A portion of HTML data of the HTML email document corresponding to the untranslated first email message is replaced with the HTML data representing the translated first email message (590) For example, the translation header element 310 can replace the portion of HTML data of the email page corresponding to the untranslated first email message with the HTML of the translated first email message. The email page including the HTML of the translated first message can then be rendered by the web browser and displayed on the client device without a reload of the email page.

In still other implementations, instead of replacing the portion of HTML of the email page corresponding to the untranslated first message with the HTML of the translated first email message, the translation header element 310 can cause the web browser to render the HTML of the translated first email message for display on another portion of the displayed email page, such as in a message box, pop up box, tool tip or designated translation display area.

In FIG. 5C, the translation header 550 is displayed in a second display configuration. The second display configuration indicates that the portion of the document has been translated subsequent to a selection of the selectable option shown in FIG. 5B (e.g., the "Translate" button). The user can select "View original message" to view the message in its original form, or select "Change language" to translate the body text of the message to another language. If the latter option is selected, the original text of the email message is translated to a new language specified by the user, i.e., the process steps 506-512 above are re-executed to provide a translation of the original text to another different language. Thus the "Change Language" option causes the original text in the email message to be translated to the new language as opposed to the currently translated text (e.g., in English) to be translated to the new language.

Figure 6:
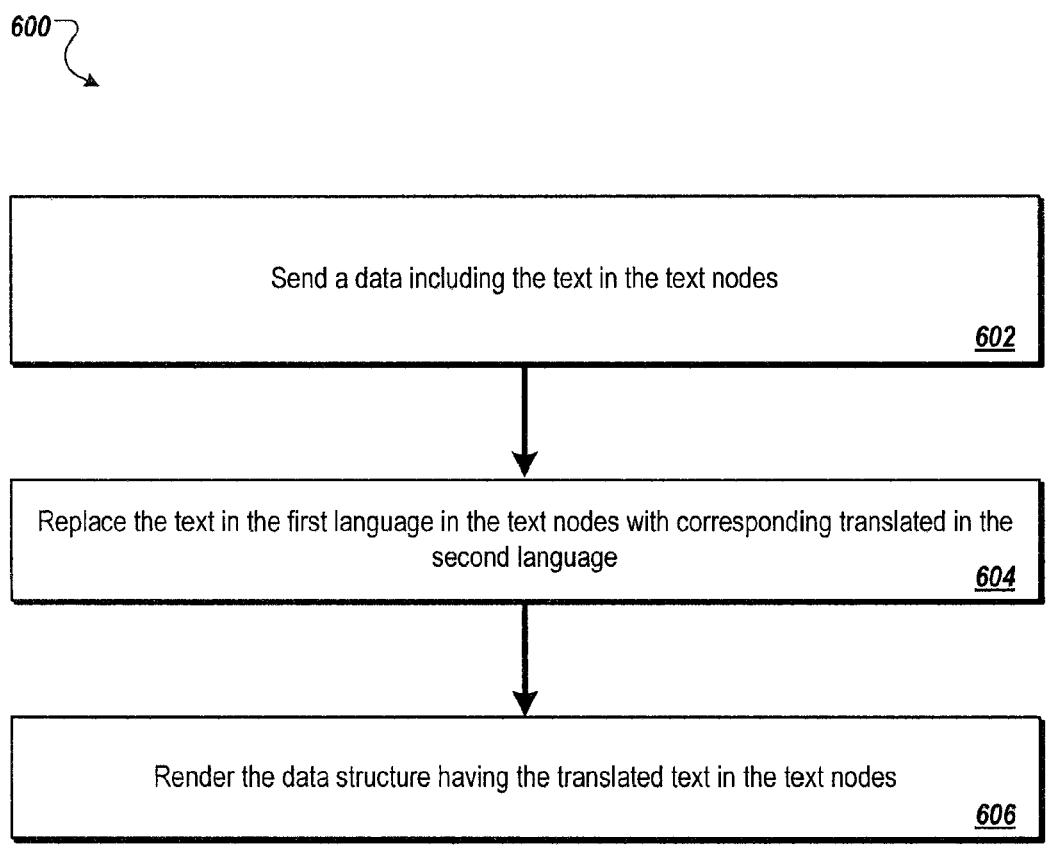
FIG. 6 is a flow diagram for an example method for translating text in an HTML web page.

FIG. 6 is a flow diagram for an example method 600 for translating text in an HTML web page. The web document is an HTML web page, and is represented by a data structure. The data structure includes text nodes, each text node includes respective text of the HTML web page text.

A request with data including the text in the text nodes, as distinct objects, is sent to a translation server to translate the text (602). In some implementations the data is the DOM representation of the document or a copy of the DOM representation. In other implementations the data is sent in multiple segments, i.e., portions of the data are individually sent to the translation server. The web browser 304 can, for example, send a request to the translation server 308 to translate the text.

The text in the first language in the text nodes are replaced with corresponding translated text in the second language (604). The translated text are received from the translation server. For example, the translation header element 310 can replace text in the first language in the text nodes with corresponding translated text in the second language.

The data structure having the translated text in the text nodes is rendered (606). In some implementations the data structure is a DOM representation and the web browser renders the DOM representation to display the HTML web page with the translated text. The web browser 304 can, for example, render the data structure having the translated text in the text nodes.

A similar method of requesting and receiving translated text in a markup language document, such as the HTML web page of example method 600, is described in U.S. patent application Ser. No. 61/161,309, entitled "WEB TRANSLATION WITH DISPLAY REPLACEMENT," filed on Mar. 18, 2009, which is hereby incorporated by reference. However, other translation methods can also be used.

Figure 7:
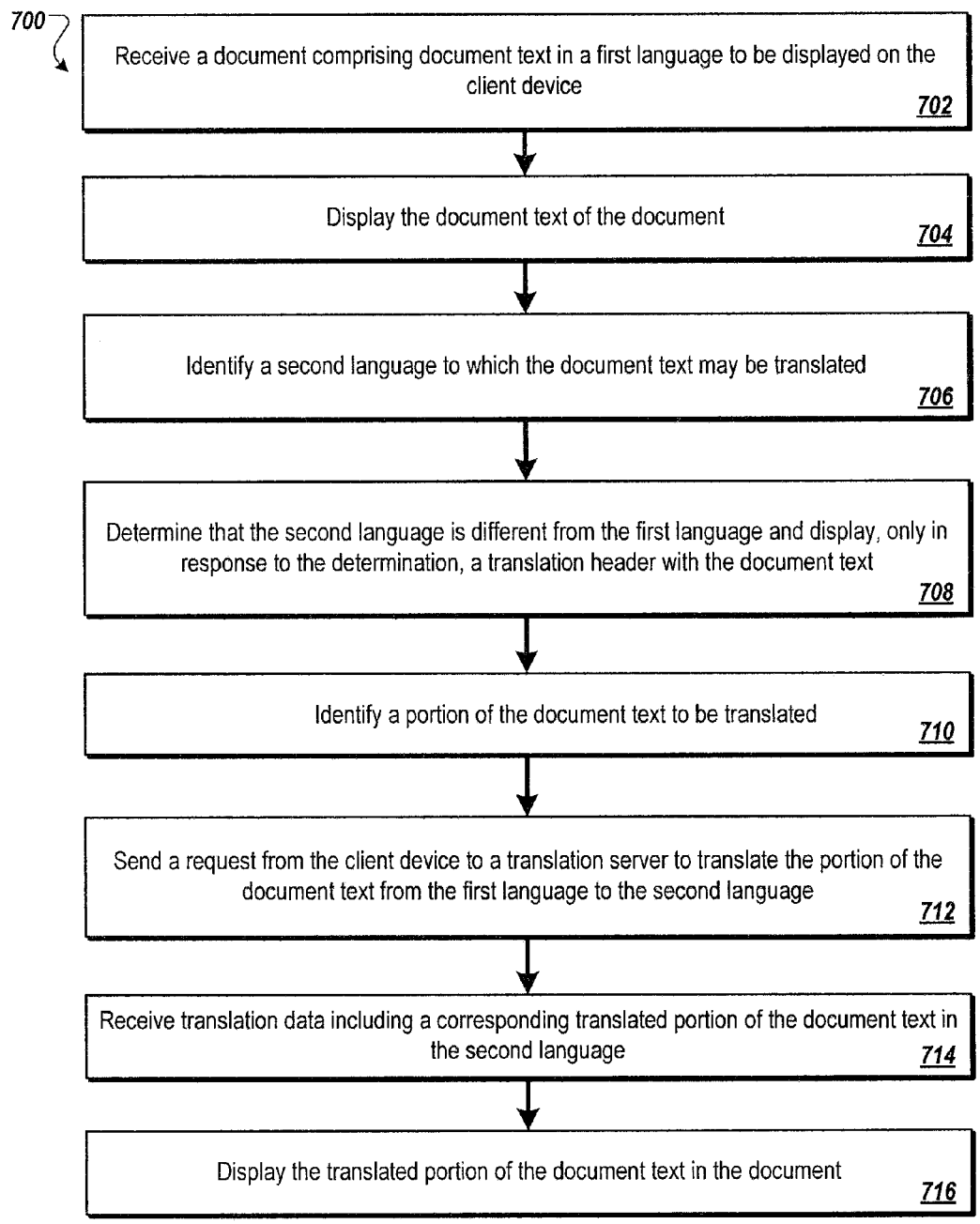
FIG. 7 is a flow diagram for an example method for providing a conditional translation header for translation of web document text in a web document.

FIG. 7 is a flow diagram for an example method 700 for providing a conditional translation header for translation of web document text in a web document, In general, example method can be implemented on a computer with a web browser.

A document comprising document text in a first language to be displayed on a client device is received (702). The web browser 304 can, for example, retrieve the document by using a hypertext transfer protocol (HTTP) for the client device 302. In some implementations, the first language of the document text can be identified from a user input. For example, the user input can be from selection of a selectable option in the translation header displayed with the document text.

The document text of the document is displayed (704). The document can be a markup language document and the web browser 304 can render the markup language document for display on the client device 302.

A second language to which the document text may be translated is identified (706). The second language can be a user's preferred language (e.g., the native language of the user). The user's preferred language can be determined, for example, from local settings on the client device (e.g., 302), such as web browser language settings, or from a cookie including data from past translations and the corresponding second languages (e.g., the data may indicate that a user requested translation to a certain second language). The translation header element 310 can, for example, identify the second language. In some implementations, the second language can be identified from a user input. For example, the user input can be from selection of a selectable option in the translation header.

The second language is determined to be different from the first language and, only in response to the determination, a translation header is displayed with the document text (708). The translation header includes text in the second language describing a selectable option in the translation header to translate document text from the first language to the second language. For example, the display of a translation header with document text is represented by display format 120 and shown in example display 202.

In some implementations, the translation header is displayed simultaneously or substantially simultaneously with the display of the document text. In other implementations, the translation header disappears if, after a predefined time period, the user does not select a translation option.

The translation header element 310 can, for example, determine that the second language is different from the first language, and the web browser 304 can, for example, render the document including the translation header 346 and the document text 312.

In response to a selection of the selectable option, a portion of the document text to be translated is identified (710). The portion of the document text can be the entire document text or less than the entire document text. In some implementations, the portion of document text is identified based on the type of document. For example, if the document is an HTML web page then the portion of the document text is all of the document text that can be translated (e.g., some document text may be identified as non-translatable by a "no translate" flag). In another example, if the document is an HTML email page then the portion of the document text is the portion of the document text corresponding to the active email message. In other implementations, the portion of document text is identified based on user input, such as highlighting a portion of the document text. The translation header element 310 and/or the web browser 304 can, for example, identify a portion of the document text to be translated.

A request from the client device is sent to a translation server to translate the portion of the document text from the first language to the second language (712). The web browser 304 can, for example, send a request to a translation server 308 to translate the portion of the document text from the first language to the second language. In some implementations, the request is sent in accord with the method described in FIGS. 5A and 5D In other implementations, the request is sent in accord with the method described in FIG. 6.

Although the translation process performed by the translation server will often correctly identify the first language of the document text, as mentioned above, a user may specify the first language in the request to ensure that the first language of the document text is not misidentified. The translation header may provide a selectable option by which a user can designate the first language.

In response to the request, translation data including a corresponding translated portion of the document text in the second language is received (714). For example, the web browser 304 and/or the translation header element 310 can receive the translation data.

The translated portion of the document text is displayed (716). The web browser 304 can, for example, render the web document including the translated portion of the document text to display the translated portion of the document text on the client device 302. For example, the display of a translation header with document text is represented by display format 130 and shown in example display 204. In some implementations, the translated portion of the document text is displayed in accord with the method described in FIGS. 5A and 5D. In other implementations, the translated portion of the document text is displayed in accord with the method described in FIG. 6.

The document can contain a link to another document (e.g., a link to another web page). In some implementations, upon selection of the link, the translation header element 310 can cause the web browser to include data defining the second language in a request for the another document. The included data can cause the another document to be automatically displayed by the web browser in the second language. For example, the document text of a web page may have been translated from Spanish to English (e.g., by use of the translation element 310 and the process described above). If a link included in the web page is for a second page with text in Spanish, then upon selection of the link, the translation header element 310 can cause the web browser to append data (e.g., an identifier) to the request for the second web page indicating that translation of the second web page's text to English is requested. Given that the second web page includes a translation header element 310 (or another translation mechanism in the web page or web browser), the second web page will automatically be rendered by the web browser with its text translated to English.

In some implementations, the data appended to the request (or otherwise identified in the request) by the web browser is a query parameter (e.g., item (F), a URL parameter). For example, if the requested URL is "http://www.example.com," then the web browser can append "#trans|target language" to the request, where "target language" is the second language. Thus the request would be, for example, "http://www.example.com? . . . #trans|target language."

Although the translation header element (e.g., 310) has been discussed above as being included in the web document (e.g., 306), in some implementations the functionality of the translation header element is provided in an add-in component installed in the web browser 304, such as a toolbar or gadget. Further, in other implementations, the functionality of the translation header element is provided in a bookmarklet to allow the above described features to be utilized for a web page without a translation element.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer such as the client device 302, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving, at a client device, a document for a web page, the document comprising document text in a first language to be displayed on the client device;
   displaying, at the client device, the web page in web browser software executing at the client device, wherein the web page includes the document text of the document;
   identifying, at the client device, a second language to which the document text may be translated;
   determining, at the client device, whether the second language is different from the first language;
   displaying, at the client device, a translation header as part the web page above a portion of the document text to be translated when the second language is determined to be different from the first language, the translation header including (i) a selectable option to translate the portion of the document text from the first language to the second language and (ii) text in the second language describing the selectable option; and
   in response to a selection of the selectable option:
      identifying, at the client device, the portion of the document text to be translated;
      sending a request from the client device to a translation server to translate the portion of the document text from the first language to the second language;
      in response to the request, receiving at the client device translation data including a corresponding translated portion of the document text in the second language; and
      displaying, at the client device, the translated portion of the document text of the document as part of the web page.

2. The method of claim 1, wherein:
   the document text comprises body text of respective email messages, and the body text are displayed as representations of the email messages;
   identifying the portion of the document text to be translated comprises identifying body text of a first email message of the email messages to be translated;
   determining that the second language is different from the first language comprises determining for the body text of the first email message that the second language is different from the first language;
   sending the request from the client device to a translation server to translate the portion of the document text comprises sending a request to translate the body text of only the first email message;
   receiving the translation data including a corresponding translated portion of the document text in the second language comprises receiving translation data including translated body text of the first email message in the second language; and
   displaying the translated portion of the document text of the document comprises displaying the translated body text of the first email message and the body text of a remainder of the email messages.

3. The method of claim 2, wherein:
   the document is represented by a data structure, the data structure including text nodes, each text node including respective body text of a respective email message;
   sending a request to translate the body text of only the first email message comprises sending the request without the body text of the first email message, wherein the request includes an identifier of the first email message; and
   displaying the translated body text of the first email message comprises:
      replacing, in the respective text node, the body text of the first email message in the first language with the translated body text of the first email message in the second language; and
      rendering the data structure having the translated body text included in the respective text node.

4. The method of claim 3, wherein the data structure is a document object model representation.

5. The method of claim 1 wherein:
   the document is an HTML email document the document text comprises body text of respective email messages, and the body text are displayed as representations of the email messages;
   identifying a portion of the document text to be translated comprises identifying body text of a first email message of the email messages to be translated;
   determining that the second language is different from the first language comprises determining for the body text of the first email message that the second language is different from the first language;
   sending a request from the client device to a translation server to translate the portion of the document text comprises sending a request for HTML data representing only the translated first email message;
   receiving translation data including a corresponding translated portion of the document text in the second language comprises receiving the HTML data representing the translated first email message; and
   displaying the translated portion of the document text of the document comprises:
      replacing a portion of HTML data of the HTML email document corresponding to the first email message with the HTML data representing the translated first email message.

6. The method of claim 1, wherein:
   the document is represented by a data structure, the data structure including text nodes, each text node including respective text of the document text;
   sending a request from the client device to a translation server to translate the portion of the document text comprises sending data including the text in the text nodes, as distinct objects, to the translation server; and
   displaying the translated portion of the document text in the document comprises:
      replacing the text in the first language in the text nodes with corresponding translated text in the second language; and
      rendering the data structure having the translated text in the text nodes.

7. The method of claim 1, wherein the document comprises an embedded translation script that upon execution by the web browser software executing at the client device, causes the client device to perform operations including:
- identifying a second language to which the document text may be translated;
- determining that the second language is different from the first language and displaying only in response to the determination a translation header with the document text; and
- identifying a portion of the document text to be translated.

8. The method of claim 1, wherein the translation header has a first display configuration and a second display configuration, wherein:
- the first display configuration includes text prompting an input for translation of the portion of the document text and text defining at least one of the first language or the second language, the first display configuration being a display configuration for the translation header prior to a selection of the selectable option; and
- the second display configuration includes text defining that the portion of the document has been translated and text defining at least one of the first language or the second language, the second display configuration being a display configuration for the translation header subsequent to a selection of the selectable option.

9. The method of claim 1, wherein the translation header includes text describing a second selectable option in the translation header to identify another first language selected by a user, the method further comprising:
- in response to a selection of the second selectable option, including the another first language in the request to the translation server to translate the portion of the document text from the another first language to the second language.

10. The method of claim 9, wherein the translation header includes text describing a third selectable option in the translation header to identify another second language selected by the user, the method further comprising:
- in response to a selection of the third selectable option, including the another second language in the request to the translation server to translate the portion of the document text from the another first language to the another second language.

11. The method of claim 1, wherein identifying a second language comprises:
- identifying a plurality of second languages from different respective second language source indicators;
- ordering the plurality of second languages relative to each other based on the respective second language source indicators; and
- identifying a highest-ordered second language as the identified second language.

12. The method of claim 1, wherein the document comprises a link to another document and upon selection of the link, the method further comprising:
- including data defining the second language in a request for the another document.

13. A system, comprising: one or more computers operable to perform operations comprising:
- receiving, at a client device, a document for a web page, the document comprising document text in a first language to be displayed on the client device;
- displaying, at the client device, the web page in web browser software executing at the client device, wherein the web page includes the document text of the document;
- identifying, at the client device, a second language to which the document text may be translated;
- determining, at the client device, whether the second language is different from the first language;
- displaying, at the client device, a translation header as part the web page above a portion of the document text to be translated when the second language is determined to be different from the first language, the translation header including (i) a selectable option to translate the portion of the document text from the first language to the second language and (ii) text in the second language describing the selectable option; and
- in response to a selection of the selectable option:
  - identifying, at the client device, the portion of the document text to be translated;
  - sending a request from the client device to a translation server to translate the portion of the document text from the first language to the second language;
  - in response to the request, receiving at the client device translation data including a corresponding translated portion of the document text in the second language; and
  - displaying, at the client device, the translated portion of the document text as part of the web page.

14. The system of claim 13, wherein:
- the document text comprises body text of respective email messages, and the body text are displayed as representations of the email messages;
- identifying a portion of the document text to be translated comprises identifying body text of a first email message of the email messages to be translated;
- determining that the second language is different from the first language comprises determining for the body text of the first email message that the second language is different from the first language;
- sending a request from the client device to a translation server to translate the portion of the document text comprises sending a request to translate the body text of only the first email message;
- receiving translation data including a corresponding translated portion of the document text in the second language comprises receiving translation data including translated body text of the first email message in the second language; and
- displaying the translated portion of the document text in the document comprises displaying the translated body text of the first email message and the body text of a remainder of the email messages.

15. The system of claim 14, wherein:
- the document is represented by a data structure, the data structure including text nodes, each text node including respective body text of a respective email message;
- sending a request to translate the body text of only the first email message comprises sending the request without the body text of the first email message, wherein the request includes an identifier of the first email message; and
- displaying the translated body text of the first email message comprises:
  - replacing, in the respective text node, the body text of the first email message in the first language with the translated body text of the first email message in the second language; and
  - rendering the data structure having the translated body text included in the respective text node.

16. The system of claim 15, wherein the data structure is a document object model representation.

17. The system of claim 13, wherein:
the document is represented by a data structure, the data structure including text nodes, each text node including respective text of the document text;
sending a request from the client device to a translation server to translate the portion of the document text comprises sending data including the text in the text nodes, as distinct objects, to the translation server; and
displaying the translated portion of the document text in the document comprises:
replacing the text in the first language in the text nodes with corresponding translated text in the second language; and
rendering the data structure having the translated text in the text nodes.

18. The system of claim 13, wherein the document comprises an embedded translation script that upon execution by the web browser software executing at the client device, causes the client device to perform operations including:
identifying a second language to which the document text may be translated;
determining that the second language is different from the first language and displaying only in response to the determination a translation header with the document text; and
identifying a portion of the document text to be translated.

19. The system of claim 13, wherein:
the translation header has a first display configuration and a second display configuration, the first display configuration includes text prompting an input for translation of the portion of the document text and text defining at least one of the first language or the second language, the first display configuration being a display configuration for the translation header prior to a selection of the selectable option; and
the second display configuration includes text defining that the portion of the document has been translated and text defining at least one of the first language or the second language, the second display configuration being a display configuration for the translation header subsequent to a selection of the selectable option.

20. A computer program product encoded on a non-transitory computer readable storage medium comprising instructions that when executed by a data processing apparatus cause the data processing apparatus to perform operations comprising:
retrieving a document for a web page, the document comprising document text in a first language to be displayed on a client device;
displaying the web page in web browser software executing at the client device, wherein the web page includes the document text of the document;
identifying a second language to which the document text may be translated;
determining whether the second language is different from the first language;
displaying a translation header as part the web page above a portion of the document text to be translated when the second language is determined to be different from the first language, the translation header including (i) a selectable option to translate the portion of the document text from the first language to the second language and (ii) text in the second language describing the selectable option; and
in response to a selection of the selectable option:
identifying the portion of the document text to be translated;
sending a request to a translation server to translate the portion of the document text from the first language to the second language;
in response to the request, receiving translation data including a corresponding translated portion of the document text in the second language; and
displaying the translated portion of the document text.

21. The computer program product of claim 20, wherein:
the document text comprises body text of respective email messages, and the body text are displayed as representations of the email messages;
identifying a portion of the document text to be translated comprises identifying body text of a first email message of the email messages to be translated;
determining that the second language is different from the first language comprises determining for the body text of the first email message that the second language is different from the first language;
sending a request from the client device to a translation server to translate the portion of the document text comprises sending a request to translate the body text of only the first email message;
receiving translation data including a corresponding translated portion of the document text in the second language comprises receiving translation data including translated body text of the first email message in the second language; and
displaying the translated portion of the document text of the document comprises displaying the translated body text of the first email message and the body text of a remainder of the email messages;
and wherein:
the document is represented by a data structure, the data structure including text nodes, each text node including respective body text of a respective email message;
sending a request to translate the body text of only the first email message comprises sending the request without the body text of the first email message, wherein the request includes an identifier of the first email message; and
displaying the translated body text of the first email message comprises:
replacing, in the respective text node, the body text of the first email message in the first language with the translated body text of the first email message in the second language; and
rendering the data structure having the translated body text included in the respective text node.

* * * * *